United States Patent
Ghoniem et al.

(10) Patent No.: US 10,774,724 B2
(45) Date of Patent: Sep. 15, 2020

(54) DUAL STAGE INTERNAL COMBUSTION ENGINE AFTERTREATMENT SYSTEM USING EXHAUST GAS INTERCOOLING AND CHARGER DRIVEN AIR EJECTOR

(71) Applicant: Tecogen, Inc., Waltham, MA (US)

(72) Inventors: Ahmed F. Ghoniem, Winchester, MA (US); Robert Panora, Cambridge, MA (US); Jean Roy, Middleton, MA (US); Joseph Gehret, North Reading, MA (US)

(73) Assignee: Tecogen, Inc., Waltham, MA (US)

( * ) Notice: Subject to any disclaimer, the term of this patent is extended or adjusted under 35 U.S.C. 154(b) by 98 days.

(21) Appl. No.: 15/496,828

(22) Filed: Apr. 25, 2017

(65) Prior Publication Data
US 2018/0230883 A1 Aug. 16, 2018

Related U.S. Application Data

(60) Provisional application No. 62/457,846, filed on Feb. 11, 2017.

(51) Int. Cl.
*F01N 3/02* (2006.01)
*F01N 3/08* (2006.01)
(Continued)

(52) U.S. Cl.
CPC ....... *F01N 13/009* (2014.06); *B01D 53/9418* (2013.01); *B01D 53/9445* (2013.01);
(Continued)

(58) Field of Classification Search
CPC ........ F01N 3/0205; F01N 3/021; F01N 3/023; F01N 3/035; F01N 3/05; F01N 3/101;
(Continued)

(56) References Cited

U.S. PATENT DOCUMENTS 5,894,834 A 4/1999 Kim
6,343,572 B1 2/2002 Pfaff et al.
(Continued)

FOREIGN PATENT DOCUMENTS

WO WO1999012642 A1 3/1999

OTHER PUBLICATIONS

ISA, "International Search Report", PCT/US2017/029423, dated Sep. 15, 2017.
(Continued)

*Primary Examiner* — Mark A Laurenzi
*Assistant Examiner* — Dapinder Singh
(74) *Attorney, Agent, or Firm* — Intrinsic Law Corp.

(57) ABSTRACT

An exhaust aftertreatment system includes a first stage catalytic converter, a second stage catalytic converter, and a conduit extending from the first stage catalytic converter to the second stage catalytic converter. The conduit passes through an exhaust gas intercooler, between the first and second stage catalytic converts, that reduces the temperature of the exhaust to about 300° F. to about 500° F. Air is ejected into the exhaust conduit to increase the oxygen concentration in the exhaust before it passes through the second stage catalytic converter. The air can be ejected from an air ejection conduit that extends to an engine charger compressor or a compressed air conduit that extends from the engine charger compressor, such as a turbo charger and/or a supercharger, to the engine. A gas particulate filter can be disposed in the exhaust conduit or it can be integrated with the second stage catalytic converter, for example as a catalyzed gas particulate filter.

17 Claims, 11 Drawing Sheets

(51) Int. Cl.
    *F01N 3/20*     (2006.01)
    *F01N 13/00*     (2010.01)
    *F01N 9/00*     (2006.01)
    *B01D 53/94*     (2006.01)
    *F01N 3/021*     (2006.01)
    *B01D 53/96*     (2006.01)
    *F01N 3/035*     (2006.01)
    *F01N 3/10*     (2006.01)
    *F01N 13/08*     (2010.01)
    *F01N 3/32*     (2006.01)
    *F01N 11/00*     (2006.01)

(52) U.S. Cl.
    CPC ..... *B01D 53/9454* (2013.01); *B01D 53/9477* (2013.01); *B01D 53/9495* (2013.01); *B01D 53/96* (2013.01); *F01N 3/021* (2013.01); *F01N 3/0205* (2013.01); *F01N 3/035* (2013.01); *F01N 3/0821* (2013.01); *F01N 3/0835* (2013.01); *F01N 3/10* (2013.01); *F01N 3/32* (2013.01); *F01N 9/00* (2013.01); *F01N 9/002* (2013.01); *F01N 11/007* (2013.01); *F01N 13/08* (2013.01); *B01D 2255/102* (2013.01); *B01D 2255/904* (2013.01); *B01D 2255/915* (2013.01); *F01N 2900/0418* (2013.01); *F01N 2900/08* (2013.01); *F01N 2900/10* (2013.01); *F01N 2900/1404* (2013.01); *Y02A 50/2322* (2018.01); *Y02T 10/20* (2013.01); *Y02T 10/22* (2013.01); *Y02T 10/47* (2013.01)

(58) Field of Classification Search
    CPC . F01N 3/103; F01N 3/225; F01N 3/30; F01N 13/009; F01N 13/0093; F01N 13/0097; F01N 11/007; F01N 2240/02; F01N 2250/02; F01N 2250/10; F01N 2270/10; F01N 2560/025; F01N 2900/0422; F01N 2900/1402; F01N 2900/1404; F02B 37/16; F02B 37/164; F02B 37/168
    USPC ............ 60/274, 276, 277, 280, 289, 295, 60/297–299, 307, 311, 320
See application file for complete search history.

(56) References Cited

U.S. PATENT DOCUMENTS

| | | | |
|---|---|---|---|
| 6,568,179 B2* | 5/2003 | Deeba | F01N 3/0814 60/298 |
| 6,871,489 B2 | 3/2005 | Turnati et al. | |
| 7,246,487 B2 | 7/2007 | Hara | |
| 2006/0021332 A1* | 2/2006 | Gaiser | F01N 3/0256 60/286 |
| 2006/0130469 A1 | 6/2006 | Baeuerle et al. | |
| 2008/0134648 A1 | 6/2008 | Duvinags et al. | |
| 2009/0217649 A1 | 9/2009 | Bremser et al. | |
| 2010/0043413 A1 | 2/2010 | Orihashi et al. | |
| 2011/0126517 A1 | 6/2011 | Miyoshi et al. | |
| 2011/0138807 A1 | 6/2011 | Ulrey et al. | |
| 2011/0139131 A1 | 6/2011 | Kardos | |
| 2011/0265451 A1 | 11/2011 | Gehret et al. | |
| 2012/0090295 A1* | 4/2012 | Yacoub | F01N 3/0871 60/274 |
| 2012/0124995 A1* | 5/2012 | Springer | F01N 3/021 60/605.1 |
| 2012/0167553 A1 | 7/2012 | Qi et al. | |
| 2013/0312407 A1* | 11/2013 | Surnilla | F01N 3/22 60/605.1 |
| 2014/0026543 A1* | 1/2014 | Danckert | F01N 3/033 60/274 |
| 2014/0041367 A1 | 2/2014 | Balthes et al. | |
| 2014/0060013 A1 | 3/2014 | Dunn | |
| 2014/0230410 A1 | 8/2014 | Yacoub | |
| 2015/0013328 A1* | 1/2015 | Carstensen | F01K 23/065 60/597 |
| 2015/0107228 A1 | 4/2015 | Klingmann et al. | |
| 2016/0076419 A1* | 3/2016 | Roy | F01N 3/2889 60/274 |
| 2016/0279572 A1 | 9/2016 | Roy et al. | |

OTHER PUBLICATIONS

ISA, "International Search Report", PCT/US2017/043711, dated Oct. 5, 2017.

ISA, "International Search Report", PCT/US2017/059488, dated Jan. 25, 2018.

* cited by examiner

DUAL STAGE INTERNAL COMBUSTION ENGINE AFTERTREATMENT SYSTEM USING EXHAUST GAS INTERCOOLING AND CHARGER DRIVEN AIR EJECTOR

CROSS-REFERENCE TO RELATED APPLICATIONS

This application claims priority to U.S. Provisional Application No. 62/457,846, titled "Assemblies and Methods for Reducing Particulate Matter, Hydrocarbons, and Gaseous Oxides from Internal Combustion Engine Exhaust," filed on Feb. 11, 2017, which is hereby incorporated by reference.

TECHNICAL FIELD

The present application relates generally to emissions control systems for internal-combustion engines.

BACKGROUND

Vehicle emissions are highly regulated to minimize the output of environmentally-harmful exhaust emissions. The major regulated pollutants include carbon monoxide (CO), nitrogen oxide compounds ($NO_x$), and unburned hydrocarbons ($C_xH_y$). If the vehicle exhaust is left untreated, the levels of pollutants would far exceed the emissions standards set by, for example, the U.S. Environmental Protection Agency, the states, or another country.

To meet these standards, vehicles include exhaust aftertreatment systems that include catalytic converters, such as three-way catalytic (TWC) converters, to convert gaseous CO, $NO_x$, and $C_xH_y$ into less harmful compounds through oxidation and reduction reactions. An example of such an exhaust aftertreatment system is illustrated in FIG. 1, which is a block diagram of an underbody of a vehicle 10. The vehicle 10 includes engine 100, first catalytic converter 110, second catalytic converter 120, and muffler 130, which are in fluid communication with one another through pipe or conduit 140. In operation, the engine 100 generates exhaust, which travels through conduit 140 to first catalytic converter 110, second catalytic converter 120, muffler 130, and then into the environment through tail pipe 150.

Recently, emissions regulators have become increasingly concerned about particulate emissions and setting limits on their levels in engine exhausts both in terms of their total mass (PM) and number (PN). These particulates are generated inside internal combustion engines in three basic forms: (1) condensables (also referred to as PM2.5 when their size is less than 2.5 microns), (2) pure solids, generally referred to as "black carbon," and (3) carbon particles saturated with volatile hydrocarbon condensables, generally referred to as semivolatile particles or "brown carbon." At the high temperatures typical inside a standard exhaust aftertreatment system, such as that illustrated in FIG. 1, some these particulates form into liquid-phase and solid-phase particulates before the exhaust gases reach the tailpipe, while some of the volatile hydrocarbon condensables remain in their gaseous phase. After exiting the tailpipe, volatile hydrocarbon condensables cool and return to the liquid phase, appearing as an aerosol. The final state of the condensables depends on the temperature, degree of dilution, other particulates in the atmosphere, etc.

Gasoline particulate filters (GPFs) and catalyzed gasoline particulate filters (cGPFs), coupled in some form to a catalytic converter, have been proposed for removing particulates from hot exhaust gases before they exit the tailpipe. However, GPFs and cGPFs cannot remove volatile hydrocarbon condensables in their gaseous form. In addition to exiting the exhaust system as a liquid (e.g., as an aerosol), gaseous volatile hydrocarbon condensables can form additional particulates downstream of the GPF/cGPF, for example in the muffler or as they exit the tail pipe.

An additional problem with existing exhaust aftertreatment systems is that the high operating temperatures of the second catalytic converter 120 cause $NO_x$ to reform, which is undesirable and, in some instances, prevents the vehicle from complying with emissions regulations.

It would be desirable to overcome one or more of the foregoing problems.

SUMMARY

Example embodiments described herein have innovative features, no single one of which is indispensable or solely responsible for their desirable attributes. The following description and drawings set forth certain illustrative implementations of the invention in detail, which are indicative of several exemplary ways in which the various principles of the invention may be carried out. The illustrative examples, however, are not exhaustive of the many possible embodiments of the invention. Without limiting the scope of the claims, some of the advantageous features will now be summarized. Other objects, advantages and novel features of the invention will be set forth in the following detailed description of the invention when considered in conjunction with the drawings, which are intended to illustrate, not limit, the invention.

An aspect of the invention is directed to an exhaust aftertreatment system comprising: a first catalytic converter including a three-way catalyst, the first catalytic converter receiving an exhaust generated by a spark-ignited internal combustion engine; a second catalytic converter including an oxidation catalyst or a three-way catalyst; an exhaust gas intercooler disposed between said first catalytic converter and said second catalytic converter, said exhaust gas intercooler configured to reduce a temperature of said exhaust to about 300° F. to about 500° F.; an exhaust conduit extending from said first catalytic converter to said second catalytic converter, said exhaust conduit in thermal communication with said cooling unit; an engine charger compressor; a compressed air conduit extending from said engine charger compressor to an intake of said engine; and an air ejection conduit extending from (a) said engine charger compressor or (b) said compressed air conduit to (c) said exhaust conduit, whereby said air ejection conduit introduces a stream of compressed air into said exhaust conduit.

In one or more embodiments, the engine charger compressor is a turbocharger compressor or a supercharger compressor. In one or more embodiments, the exhaust aftertreatment system further comprises a flow control valve disposed in said air ejection conduit, said flow control valve in electrical communication with a controller to adjust an operating position of said flow control valve. In one or more embodiments, the exhaust aftertreatment system further comprises an oxygen sensor disposed in said exhaust conduit between (a) an inlet port for said compressed air conduit and (b) said second catalytic converter, the oxygen sensor outputting an oxygen content of said exhaust to said controller. In one or more embodiments, the controller is configured to adjust said operating position of said flow control valve such that said oxygen content is at least about 0.1% by volume.

In one or more embodiments, the exhaust aftertreatment system further comprises a gas particulate filter coupled to said exhaust conduit. In one or more embodiments, second catalytic converter comprises a catalyzed gas particulate filter, said catalyzed gas particulate filter comprising said oxidation catalyst or said three-way catalyst. In one or more embodiments, the exhaust gas intercooler comprises a heat exchanger, said heat exchanger including a coolant fluid loop that extends between said heat exchanger and a radiator for said engine.

Another aspect of the invention is directed to a method for reducing emissions from an engine, the method comprising: generating an exhaust in a spark-ignited internal combustion engine; passing the exhaust through a first catalytic converter that includes a three-way catalyst, the first catalytic converter reducing a first concentration of nitrogen oxide ($NO_x$), carbon monoxide (CO), and hydrocarbons ($C_xH_y$) compounds in the exhaust; passing the exhaust through an exhaust conduit that extends from said first catalytic converter to a second catalytic converter; cooling said exhaust in said exhaust conduit to about 300° F. to about 500° F.; diverting compressed air from (a) an engine charger compressor or (b) a compressed air conduit extending from said engine charger compressor to said engine; ejecting said compressed air into an inlet port of said exhaust conduit to increase an oxygen content of said exhaust; and passing said exhaust into said second catalytic converter that includes an oxidation catalyst or a three-way catalyst, the second catalytic converter reducing a second concentration of CO and $C_xH_y$ in said exhaust.

In one or more embodiments, the engine charger compressor is a turbocharger compressor or a supercharger compressor. In one or more embodiments, the method further comprises passing said compressed air through an air ejection conduit that that extends from (a) said engine charger compressor or (b) said compressed air conduit to (c) said exhaust conduit. In one or more embodiments, the method further comprises adjusting an operating position of a control valve disposed in said air ejection conduit, wherein said operating position corresponds to a flow rate of said compressed air into said exhaust conduit. In one or more embodiments, the method further comprises receiving, at a controller, an oxygen content of said exhaust from an oxygen sensor disposed in said exhaust conduit between (a) said inlet port for said compressed air conduit and (b) said second catalytic converter; and adjusting said operating position of said control valve such that said oxygen content is at least about 0.1% by volume.

In one or more embodiments, the method further comprises passing said exhaust through a gas particulate filter (GPF) coupled to said exhaust conduit. In one or more embodiments, the method further comprises with said controller, determining whether a regeneration period for said GPF has been exceeded; and when said regeneration period has been exceeded, initiating a regeneration of said GPF. In one or more embodiments, the method further comprises with said controller, determining when said engine is in an idling or a coasting state; and when said engine is in said idling or said coasting state, temporarily increasing an exhaust temperature of said exhaust to oxidize particulate matter retained by said GPF, thereby regenerating said GPF. In one or more embodiments, the method further comprises returning said exhaust in said exhaust conduit to about 300° F. to about 500° F. after (a) a predetermined time period or (b) said controller determines that said engine is no longer in said idling or said coasting state. In one or more embodiments, cooling said exhaust comprises passing said exhaust through an exhaust gas intercooler.

In one or more embodiments, the second catalytic converter compromises a catalyzed gas particulate filter (cGPF), said cGPF comprising said oxidation catalyst or said three-way catalyst. In one or more embodiments, the method further comprises with said controller, determining whether a regeneration period for said cGPF has been exceeded; and when said regeneration period has been exceeded, initiating a regeneration of said cGPF. In one or more embodiments, the method further comprises with said controller, determining when said engine is in an idling or a coasting state; and when said engine is in said idling or said coasting state, temporarily increasing an exhaust temperature of said exhaust to oxidize particulate matter retained by said cGPF, thereby regenerating said cGPF. In one or more embodiments, the method further comprises returning said exhaust in said exhaust conduit to about 300° F. to about 500° F. after (a) a predetermined time period or (b) said controller determines that said engine is no longer in said idling or said coasting state.

IN THE DRAWINGS

For a Fuller Understanding of the Nature and Advantages of the Present Invention, Reference is Made to the Following Detailed Description of Preferred Embodiments and in Connection with the Accompanying Drawings, in which.

DETAILED DESCRIPTION

Figure 1:
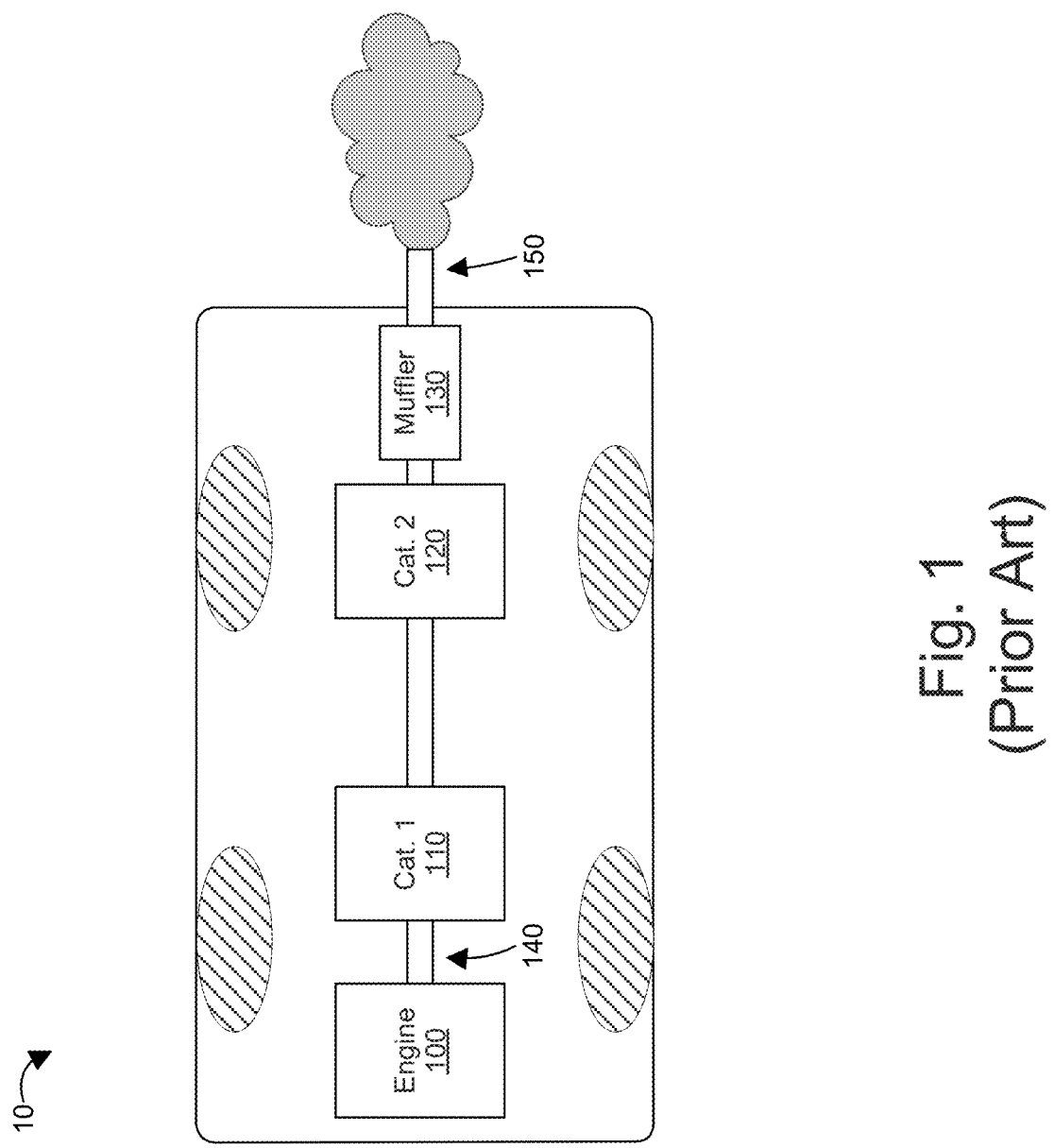
FIG. 1 is a block diagram of an underbody of a vehicle according to the prior art.

An exhaust aftertreatment system includes a first stage catalytic converter, a second stage catalytic converter, and a conduit extending from the first stage catalytic converter to the second stage catalytic converter. The conduit passes through an exhaust gas intercooler that reduces the temperature of the exhaust to 300° F. to 500° F. Air is ejected into the exhaust conduit to increase the oxygen concentration in the exhaust before it passes through the second stage catalytic converter. The air can be ejected from an air ejection conduit that extends to a vehicle charger compressor or to a compressed air conduit that extends from the vehicle charger compressor to the engine. For example, as will be described below, air from a compressor driven by an engine forced induction or charger system (e.g., turbo charger and/or supercharger) can be used as a feed-forward air supply to a downstream portion of the vehicle's exhaust components. A gas particulate filter can be disposed in the exhaust conduit or it can be integrated with the second stage catalytic converter, for example as a catalyzed gas particulate filter.

The exhaust aftertreatment system includes an exhaust gas intercooler disposed between a first stage catalytic converter and a second stage catalytic converter. The exhaust gas intercooler reduces the temperature of the exhaust to about 400° F., such as about 300° F. to about 500° F., or about 350° F. to about 450° F. Reducing the temperature of the exhausts causes gaseous condensables (e.g., volatile unburned hydrocarbons) to undergo a phase change and condense as liquids or solids, which can be collected by a gas particulate filter to reduce vehicle emissions. The gas particulate filter can be disposed between the exhaust gas intercooler and the second stage catalytic converter, or it can be integrated with the second stage catalytic converter, for example as a catalyzed gas particulate filter.

A stream of air is ejected into the exhaust stream in an exhaust conduit that extends from the exhaust gas intercooler to the second stage catalytic converter to increase the oxygen concentration in the exhaust before it enters the second stage catalytic converter to promote oxidation reactions therein. The stream of air can be ejected from an air ejection conduit that extends to a dedicated air compressor or to an engine charger compressor. Alternatively, the air ejection conduit extends to a compressed air conduit that extends between the engine charger compressor and the intake of the engine. The engine charger compressor can be a turbocharger compressor or a supercharger compressor for the engine. The introduction or ejection of compressed air into the exhaust stream leaving the exhaust gas intercooler can enhance the flow rate of exhaust through the exhaust conduit and out the tailpipe, which promotes the overall flow of exhaust from engine and reduces the pressure in the exhaust system near the exhaust valve, thereby improving engine efficiency/gas mileage and/or performance.

The pressure drop in the exhaust system is a source of loss and reducing this pressure drop by introducing compressed air downstream of the heat exchanger has overall beneficial impact on the efficiency of the engine, besides its role in the second stage oxidation catalyst. There is yet another benefit to introducing the compressed air in the exhaust system. It is known that raising the pressure during the exhaust process because of the pressure drop in the exhaust system can reduce the gas expansion inside the engine cylinders following combustion and hence can lead to losses. However, it is also true that slight increase in the back pressure after the exhaust valve during the exhaust process can increase the local exhaust gas recirculation back into the engine cylinders, or the amount of exhaust gas that is retained in the engine cylinders. This reduces the likelihood of knocking and makes it possible to tune the engine for higher efficiency with advanced spark operation. Therefore, the compressed gas ejection before the second catalyst has two benefits: reducing the back pressure to minimize its impact on the overall efficiency while maintaining sufficient back pressure to gain the benefit of reduction in the engine combustion temperature and reducing the potential for knock.

Figure 2:
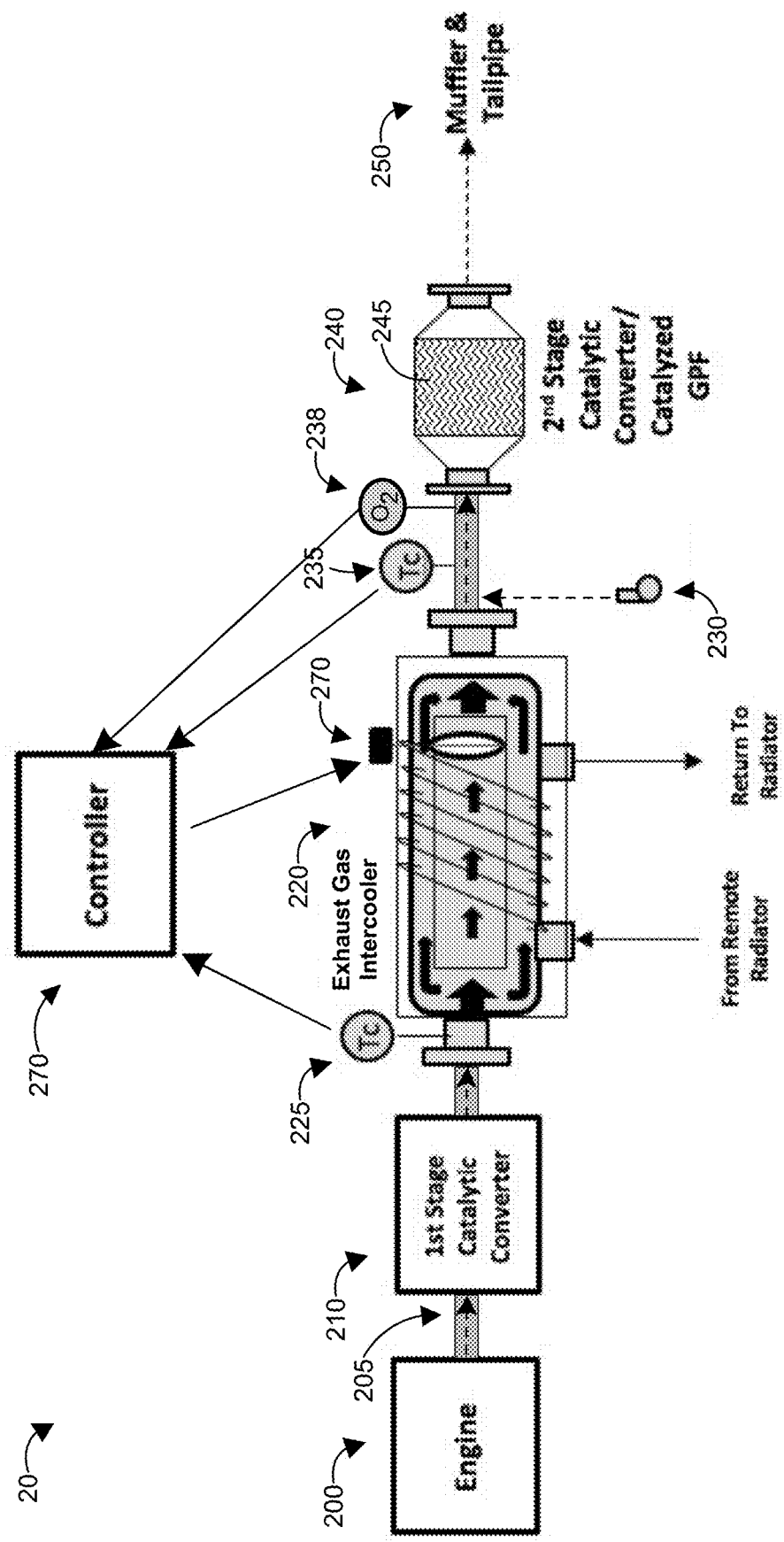
FIG. 2 is a block diagram of an exhaust aftertreatment system according to one or more embodiments.

FIG. 2 is a block diagram of an exhaust aftertreatment system 20 according to one or more embodiments. The system 20 includes a first stage catalytic converter 210, an exhaust gas intercooler (EGI) 220, a compressor 230, a second stage catalytic converter/cGPF 240, a muffler and tailpipe 250, and a controller 260. Exhaust from an internal combustion engine 200 enters an exhaust conduit 205 that extends from engine 200 to the muffler and tail pipe 250, through the first stage catalytic converter 201, EGI 220, and the second stage catalytic converter/cGPF 240. The exhaust conduit 205 can be connected to each cylinder of the engine 200 via a manifold. The exhaust enters the first stage catalytic converter 200 at or near the operating temperature of the engine at the end of the exhaust stroke. At steady state (i.e., after the engine has warmed up from a cold start), the exhaust from engine 200 reaches the exhaust system 20 in the range of about 850° F. to about 1250° F. As used herein, "about" means plus or minus 10% of the relevant value. Engine 200 can be a spark-ignited internal combustion engine or a diesel engine. In addition, engine 200 can be in a vehicle (e.g., a passenger car, a truck, a forklift, or other vehicle) or it can be stationary, for example to drive a combined heat and power (CHP) system.

The engine 200 can operate with an air-fuel ratio (AFR) in the rich burn regime (i.e., greater than or equal to the stoichiometric AFR), or in the lean burn regime (i.e., less than the stoichiometric AFR). In some embodiments, the stoichiometric AFR is 14.64:1 (by mass) for gasoline. The stoichiometric AFR can vary depending on the type of fuel. For example, the stoichiometric AFR can be lower if the fuel includes ethanol. As an example, E85 fuel (85% ethanol, 15% gasoline) can have a stoichiometric AFR of about 9.8:1. When the engine 200 operates in the rich burn regime, the exhaust contains a minimal or a substantially zero oxygen content. For example, the oxygen content can be less than or equal to about 0.1% by volume, less than or equal to about 0.05% by volume, and/or less than or equal to about 0.025% by volume.

The first stage catalytic converter 210 includes a catalyst comprising one or more platinum group metals (PGMs), such as Pt, Pd, and/or Rh. In some embodiments, the first stage catalytic converter 210 includes a TWC. The first stage catalytic converter 210 promotes chemical reactions (e.g., reduction reactions) that remove $NO_x$ compounds from the exhaust stream (e.g., by reducing $NO_x$ to form $N_2$ and $O_2$). The first stage catalytic converter 210 can also promote chemical reactions that reduce the concentration of CO and $C_xH_y$ compounds from the exhaust stream. For example the first stage catalytic converter 210 can promote the oxidation of CO and the complete or partial oxidation of $C_xH_y$ compounds.

After passing through the first stage catalytic converter 210, the exhaust flows into EGI 220 which lowers the temperature of the exhaust to an output temperature $T_{mix}$ of about 400° F., such as about 300° F. to about 500° F. or about 350° F. to about 450° F. In some embodiments, EGI 220 lowers the temperature of the exhaust to an output temperature $T_{mix}$ of about 300° F., about 325° F., about 350° F., about 375° F., about 400° F., about 425° F., about 450° F., about 475° F., about 500° F., or any value or range between any two of the foregoing values. The exhaust gas intercooler 220 can be a heat exchanger or other cooling device. EGI 220 includes a cooled path in which EGI 220 cools the exhaust and an optional bypass path that is not cooled by EGI 220. The cooled and optional bypass paths of the heat exchanger converge at the downstream end of the heat exchanger, where the paths mix and have the temperature $T_{mix}$. The exhaust that flows through the cooled path can be cooled to a temperature of about 250° F. to about 350° F., including about 275° F., about 300° F., about 325° F., or any value or range between any two of the foregoing values. EGI 220 cools the exhaust with a cooling fluid, such as radiator fluid or other coolant, which is in thermal communication with the exhaust that flows through the cooled path. For example, the cooling fluid can be received from the vehicle's radiator and pass through a coil that provides a surface area for thermal communication between the cooling fluid and the exhaust flowing through the cooled path.

The temperature $T_{mix}$ can be adjusted by varying the flow rates of the exhaust in each path. For example, EGI 220 can include a bypass valve 270 that can be adjusted to vary the flow rate of the exhaust in the bypass path. When the bypass valve 270 is closed, all of the exhaust flows through the cooled path. When the bypass valve 270 is open, the exhaust flows through both the cooled and bypass paths without restriction. The bypass valve can also be partially opened or closed to allow some exhaust to flow through the bypass path. In some embodiments, EGI 220 can also include a cooled path valve to open or close the cooled path. For example, during cold start the cooled path valve can be fully closed while the bypass valve 270 is fully open so the exhaust is at a maximum temperature when it passes through the second stage catalytic converter 240 to promote the chemical reactions at the second stage catalytic converter 240. Alternatively, EGI 220 can include a valve at its upstream side to direct the exhaust to either the cooled or bypass path, or to both the cooled and bypass paths. Any of the foregoing valves can be adjusted by controller 260, which receives as inputs a first temperature of the exhaust before it enters EGI 220, measured by thermocouple 225, and a second temperature of the exhaust after it exits EGI 220, measured by thermocouple 235. The controller 260 adjusts the valve(s) (e.g., valve 270) so that the second temperature (e.g., $T_{mix}$) is at a set point temperature of about 400° F., such as about 300° F. to about 500° F., as discussed above. The controller 260 can also adjust the flow rate of coolant in EGI 210 to adjust the second temperature (e.g., $T_{mix}$).

After the exhaust gas exits EGI 220, the exhaust in exhaust conduit 205 receives a stream of air ejected by compressor 230. The ejected air increases the oxygen concentration in the exhaust before it passes through the second stage catalytic converter 240. The increased oxygen concentration promotes oxidation reactions in the second stage catalytic converter 240 that remove carbon monoxide and unburned hydrocarbons from the exhaust. The compressor 230 can eject unheated air taken from outside of the vehicle, which can have a temperature in the range of about 32° F. (or lower in the winter) to about 90° F. (or higher in the summer), depending on the climate in which the vehicle is located. The unheated air can cause the temperature of the exhaust to decrease. In other embodiments, the ejected air is preheated in which case it has little effect on the exhaust temperature. To control for the temperature change caused by the ejected air, thermocouple 235 is preferably located downstream of the ejected air inlet to provide the appropriate feedback temperature to controller 260. Depending on the temperature of the ejected air, its introduction into the exhaust stream can lead to further condensation of volatile gaseous hydrocarbons and/or growth of existing semivolatile brown or black carbon compounds.

Compressor 230 can be a dedicated air compressor or can be a shared compressor used by other components of the vehicle. In some embodiments, compressor 230 can be a turbocharger compressor and/or a supercharger compressor associated with engine 200. For example, compressor 230 can be a turbine-driven compressor used to turbocharge engine 200 (e.g., coupled to a turbine in exhaust conduit 205). In another example, compressor 230 can be a mechanically-driven or an electrically-driven compressor (e.g., an e-compressor) used to supercharge engine 200. In some embodiments, engine 200 includes both a turbocharger compressor and a supercharger compressor.

An oxygen sensor 238 is disposed in the exhaust conduit 205 to measure the oxygen concentration of the exhaust after the air ejection. The measured oxygen concentration is sent from oxygen sensor 238 to controller 270, which compares the measured oxygen concentration to a target oxygen concentration or a target oxygen concentration range. When the measured oxygen concentration is above or below the target oxygen concentration or the target oxygen concentration range, controller 270 sends a control signal to adjust the flow rate of ejected air from compressor 230. The flow rate of ejected air can be modified by adjusting the operating conditions of compressor 230 (e.g., pressure) and/or by adjust a valve in fluid communication with compressor 230 (e.g., as described below). For example, when the measured oxygen concentration is below the target oxygen concentration or target oxygen concentration range, controller 270 sends a control signal to increase the flow rate of ejected air from compressor 230. In another example, when the measured oxygen concentration is above the target oxygen concentration or the target oxygen concentration range, controller 270 sends a control signal to decrease the flow rate of ejected air from compressor 230. The target oxygen concentration can be at least about 0.1% by volume, such as at least about 0.25% by volume, at least about 0.5% by volume, at least about 0.75% by volume, at least about 1% by volume, or a higher concentration. Likewise, the target oxygen concentration range can be about 0.1% by volume to at least about 1% by volume, or any range or value therebetween.

After receiving the ejected air from compressor 230, the exhaust passes into the second stage catalytic converter 240. The second stage catalytic converter 240 promotes chemical reactions (e.g., oxidation reactions) that remove carbon monoxide and unburned hydrocarbons (e.g., by oxidizing CO to for $CO_2$ and by oxidizing $C_xH_y$ to form $CO_2$ and $H_2O$) from the exhaust stream. At the reduced temperature that the exhaust enters the second stage catalytic converter 240 (i.e., $T_{mix}$ of about 400° F., such as about 350° F. to about 450° F.), the oxidation reactions occur without reforming nitrogen oxide compounds, which are controlled by emissions regulators. In some embodiments, the second stage catalytic converter 240 can also reduce the concentration of any remaining $NO_x$ in the exhaust. The second stage catalytic converter 240 can include a catalyst comprising one or more PGMs, such as Pt, Pd, and/or Rh. In some embodiments, the second stage catalytic converter 240 includes a TWC. In some embodiments, the second stage catalytic converter 240 can include an oxygen storage catalyst, such as Ce and/or Zr.

Figure 3:
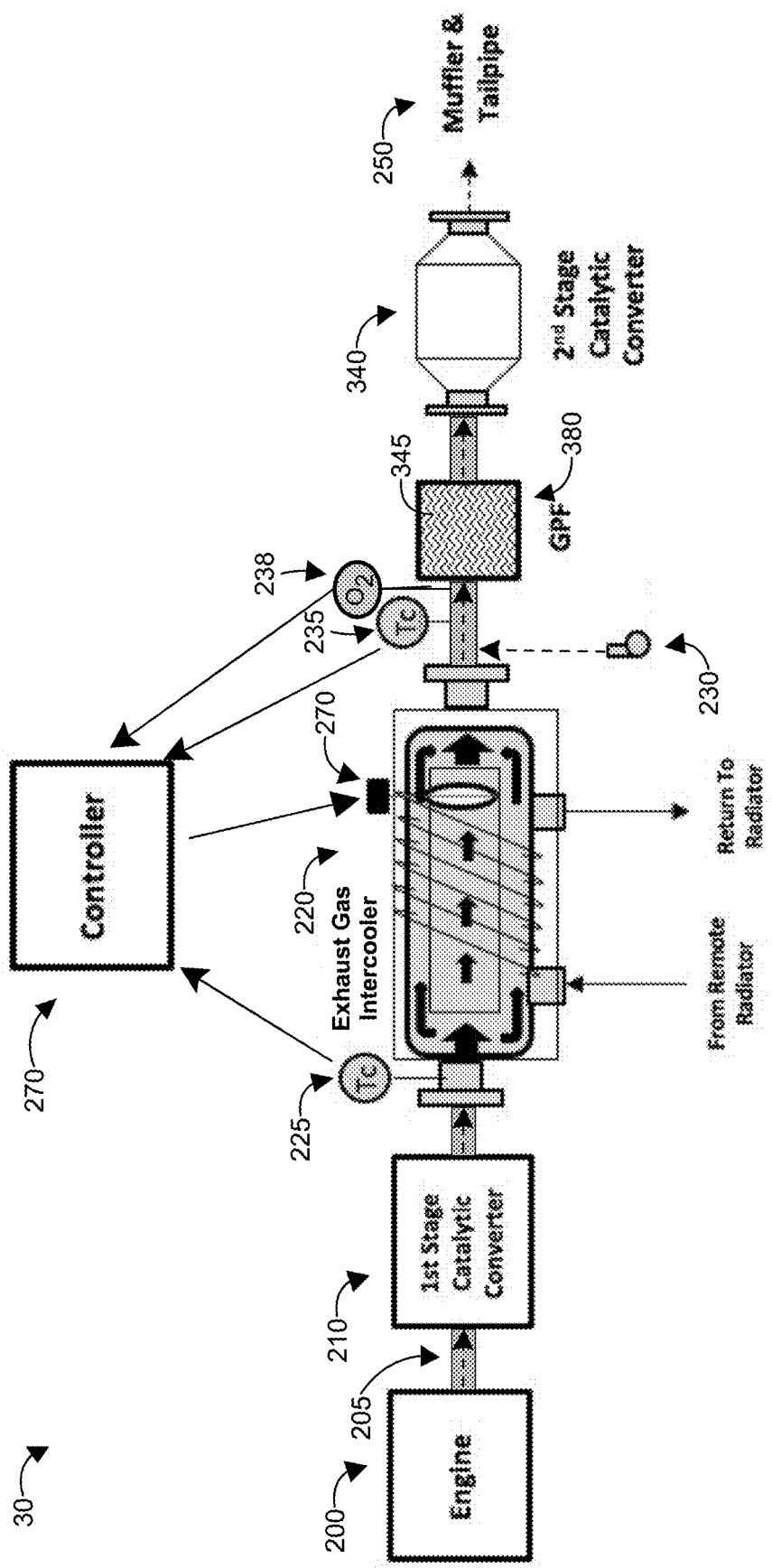
FIG. 3 illustrates an exhaust aftertreatment system according to one or more embodiments.

The second stage catalytic converter 240 also includes a GPF. The GPF can be a separate unit (e.g., a modular portion) of the second stage catalytic converter 240 or it can be integrated into the second stage catalytic converter 240. In some embodiments, the second stage catalytic converter is a cGPF, which can include some or all catalytic elements that are also disposed in the second stage catalytic converter 240. For example, the cGPF can include one or more of the above-described platinum-group metals, an oxygen storage catalyst (e.g. Ce and/or Zr), and/or it can include the catalysts that are typically included in a TWC. In some embodiments, the second stage catalytic converter 240 is a cGPF, in which case the second stage catalytic converter 240 and the GPF are merged into a single unit. In some embodiments, the second stage catalytic converter 240 and/or cGPF is integrated into a single unit that also includes the muffler 250. In an alternative embodiment, a GPF is disposed between the second stage catalytic converter 240 and the compressor 230 (e.g., as illustrated in FIG. 3).

When the exhaust gas is cooled by EGI 220 to $T_{mix}$ of about 300° F. to about 500° F., or about 400° F., as described above, more of the gaseous condensables (e.g., volatile unburned hydrocarbons) undergo a phase change and condense as liquids or solids. Thus, the reduction in temperature of the exhaust stream causes a higher fraction of the condensables in the exhaust stream to reach their liquid or solid phase while still contained in the exhaust gas stream than when the exhaust stream is not cooled. The reduction in temperature has the added benefit of forming more brown carbon when some of the gaseous condensables condense on the black carbon particles that act as nucleation sites during the phase change process.

The GPF or cGPF (in general, GPF) includes ceramic porous walls, ceramic wool, or other arrangement of permeable material structure 245 that traps particulate emissions, such as liquids (e.g., gaseous condensables) and black and brown carbon, in the exhaust. The porous walls and/or ceramic wool in permeable material structure 245 can be made of one of several materials fabricated as known in the art to collect particulate emissions. The porous walls and/or ceramic wool of permeable material structure 245 also collects the additional brown carbon and the liquid-phase condensables formed as a result of the lower exhaust temperature in the exhaust gas intercooler. Therefore, the reduction in temperature allows the GPF to trap more volatile hydrocarbon condensables, as liquid and as brown carbon, than it could when the exhaust is at a higher temperature (e.g., higher than $T_{mix}$ of about 300° F. to about 500° F., such as about 400° F.) where the liquid phase change does not occur. This reduction in the concentration in hydrocarbon condensables reduces the overall hydrocarbon emissions and reduces the chance of condensables forming particulates as the exhaust exits the tailpipe.

Embodiments of the invention described herein provide one or more of the following advantages:

(1) Cooling the exhaust gases in an exhaust gas intercooler (e.g., EGI 220) after the first stage catalytic converter 210 condenses a larger fraction of gaseous hydrocarbons into their liquid phase while they are still in the exhaust system. These can be captured by the GPF/cGPF, making it more effective in removing a larger fraction of the condensables in liquid form and as solid particulates (brown carbon) that carry the liquefied condensables.

(2) Cooling the exhaust gases in an exhaust gas intercooler (e.g., EGI 220) after the first stage catalytic converter 210 results in the formation of particles containing large fractions of semivolatiles (brown carbon) that can be more easily captured in the GPF due to their larger size. Because a higher fraction of the particles forming after the exhaust gas cooler has larger sizes, it helps the GPF filtration system remove more particulate mass and particulate numbers leaving the exhaust stream with a much smaller fraction of condensable hydrocarbons.

(3) Employing a catalyzed GPF (cGPF) can have the added benefit of replacing the second stage catalytic converter or reducing the size of second stage catalytic converter.

(4) Employing other forms of exhaust gas intercooling systems (i.e., different than EGI 220) that cool down the entire exhaust stream or fractions of it before treatment in the GPF/cGPF is also possible and will lead to similar benefits (5) The systems and processes described herein can be used in internal combustion engine designs that utilize cooled exhaust gas recirculation to reduce $NO_x$ formation in the engine and/or to improve the engine efficiency. Cooled exhaust gas recirculation is used to lower the combustion temperature in the engine and hence reducing the potential for knock without having to add extra fuel to cool the charge as is done in engines without cooled exhaust recirculation. Adding the extra fuel is undesirable because of its negative impact on the fuel economy and contribution to raising the pollutants.

(6) In a standard emissions system without intermediate exhaust cooling, the GPF/cGPF is regenerated by temporarily running the engine's AFR under fuel lean conditions to provide the extra oxygen at high temperature necessary to oxidize the particulate matter caught in the filter. This may greatly increase the formation and/or reformation of nitrogen oxides, for example in the second catalytic converter. Because the above system 20 includes additional air for oxidation (i.e., air ejected by compressor 230), regeneration of the GPF can be accomplished by temporarily increasing the temperature at the second stage catalytic converter 240 without changing the engine's AFR. While this will induce a slight increase in nitrogen oxides due to reformation, the overall tailpipe levels are much lower than would be produced by leaning the AFR. Nitrogen oxide reformation can be further reduced by increasing the temperature at a time when minimal fuel is consumed by the engine, such as when coasting down a hill or idling. Such regeneration can occur on a periodic basis, for example once a day, once a week, once every 1,000 miles, or other interval.

(7) The ejection of air from the engine charger compressor improves the flow rate of exhaust, which decreases the back pressure of exhaust, thereby improving engine efficiency. Slight rise in the back pressure can have beneficial effects on engine efficiency since it raises the fraction of the exhaust gases retained in the engine cylinders at the end of the exhaust process which helps reduce the combustion temperature and thus allow for spark advance and better efficiency without the likelihood of knocking.

FIG. 3 illustrates an exhaust aftertreatment system 30 according to one or more embodiments. System 30 is the same or similar to system 20 except as described below. In place of the combined second stage catalytic converter/cGPF 240 in system 20, system 30 includes a GPF 380 disposed between the inlet for the air ejected by compressor 230 and the inlet to second stage catalytic converter 340. In an alternative embodiment, the GPF 380 can be disposed between the outlet of EGI 220 and the inlet for the air ejected by compressor 230. The second stage catalytic converter 340 is otherwise the same or similar to second stage catalytic converter 240. For example, the second stage catalytic converter 340 can include one or more PGMs, one or more oxygen storage catalysts, and/or it can include a TWC in some embodiments.

GPF 380 is the same or similar to the GPF described above with respect to second stage catalytic converter/cGPF 240. For example, GPF 380 includes a coating 345 which is the same or similar to coating 245. Thus, coating 345 can trap black carbon, brown carbon, and condensables in liquid form. It is noted that if additional GPFs are desired in system 30, the second stage catalytic converter 340 can include a second GPF or, alternatively, it can include or can be a cGPF, as described above.

In an alternative embodiment, the compressor 230 and/or the second stage catalytic converter 340 are not included in system 30. When the compressor 230 and/or second stage catalytic converter 340 are removed from system 30, the GPF 345 still functions to trap black carbon, brown carbon, and condensables in liquid form, as discussed above. In some embodiments, compressor 230 can be a turbocharger compressor and/or a supercharger compressor associated with engine 200, as discussed above.

Figure 4:
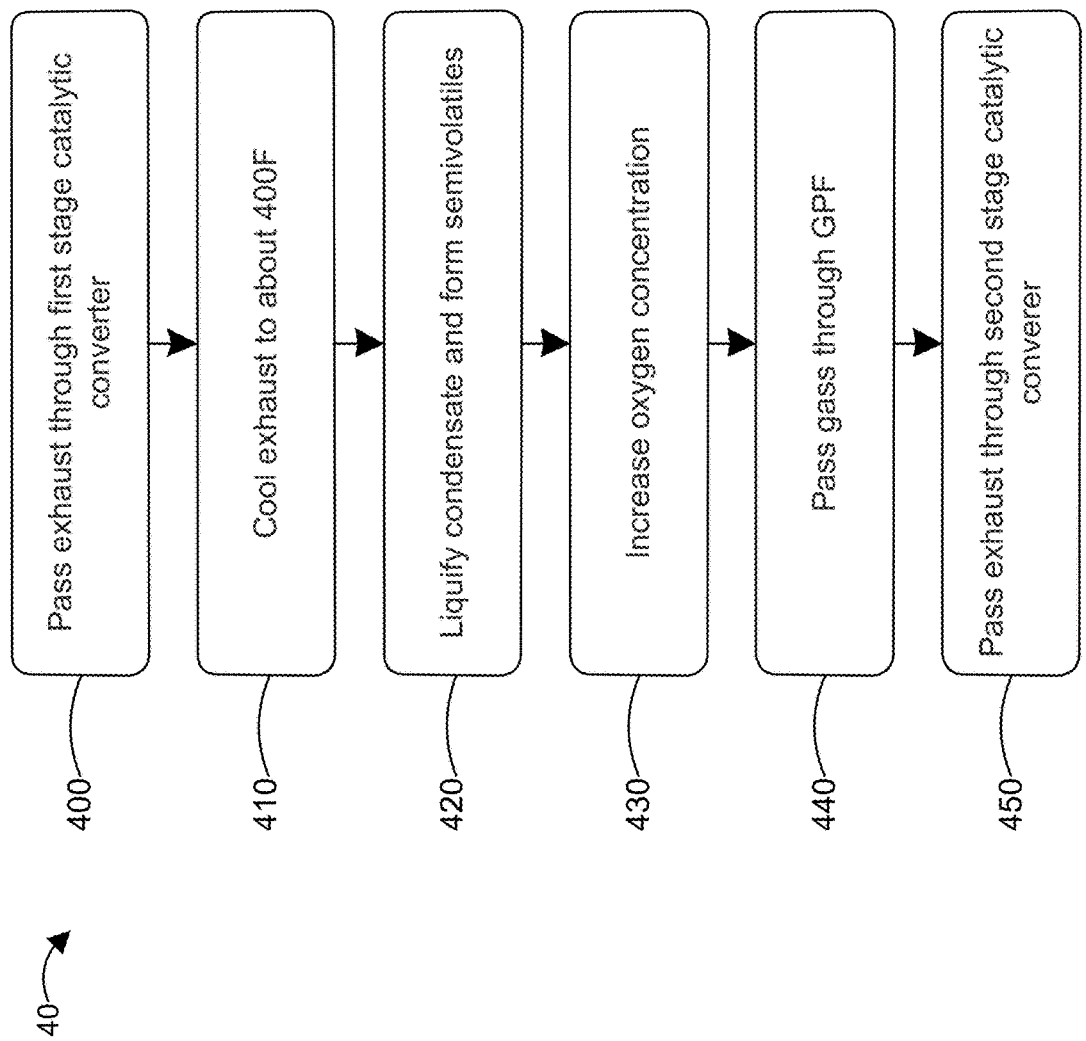
FIG. 4 is a flow chart of a method for reducing particulate matter, hydrocarbons, nitrogen oxides, and carbon monoxide from exhausts of internal combustion engines, according to one or more embodiments.

FIG. 4 is a flow chart 40 of a method for reducing particulate matter, hydrocarbons, nitrogen oxides, and carbon monoxide from exhausts of internal combustion engines. The method according to flow chart 40 can be performed on any of the systems described herein (e.g., systems 20, 30, 60, 70, 80, 90, and/or 1000). In step 400, the exhaust is passed through a first stage catalytic converter. The first stage catalytic converter includes one or more active catalytic elements (e.g., one or more PGMs and/or a TWC) that catalyzes a chemical reaction to reduce the concentration of nitrogen oxide compounds in the exhaust. The exhaust is generated by an internal combustion engine which can run at a stoichiometric or a rich AFR or a lean AFR, as described above. In step 410, the exhaust is cooled to about 400° F., such as about 300° F. to about 500° F. or about 350° F. to about 450° F. In some embodiments, the exhaust is cooled to about 300° F., about 325° F., about 350° F., about 375° F., about 400° F., about 425° F., about 450° F., about 475° F., about 500° F., or any value or range between any two of the foregoing values. The exhaust can be cooled by passing some or all of it through an exhaust gas intercooler (e.g., a heat exchanger or other cooling unit). As discussed above, a portion of the exhaust can bypass the cooling unit and the volume of cooled and bypassed exhaust can be controlled (e.g., by valves in communication with a controller) to provide the desired temperature.

In step 420, the cooled exhaust causes at least a portion of the volatile hydrocarbon condensables to undergo a phase change into a liquid. The liquid-phase condensables can remain as liquid and/or they can condense on the black carbon particles, that act as nucleation sites during the phase change process, to form semivolatile brown carbon, as discussed above. In step 430, the oxygen concentration in the cooled exhaust is increased to at least about 0.1% by volume, such as at least about 0.25% by volume, at least about 0.5% by volume, at least about 0.75% by volume, at least about 1% by volume, or a higher concentration. The oxygen concentration can be increased by ejecting air into the cooled exhaust stream, as described herein. In 440, the exhaust is passed through a GPF that includes a coating to trap the liquid-phase condensables and semivolatile particles formed in step 420 in addition to other particulates in the exhaust such as black carbon. In step 450, the exhaust is passed through a second stage catalytic converter. The second stage catalytic converter includes one or more active catalytic elements (e.g., one more PGMs; one or more oxygen storage catalysts, such as Ce and/or Zr; and/or a TWC) that catalyzes chemical reactions to reduce the concentration of unburned hydrocarbons and carbon monoxide in the exhaust. The second stage catalytic converter can also reduce the concentration of nitrogen oxide compounds in some embodiments. In some embodiments, the second stage catalytic converter is a cGPF, in which case steps 440 and 450 can be performed using the cGPF.

Figure 5:
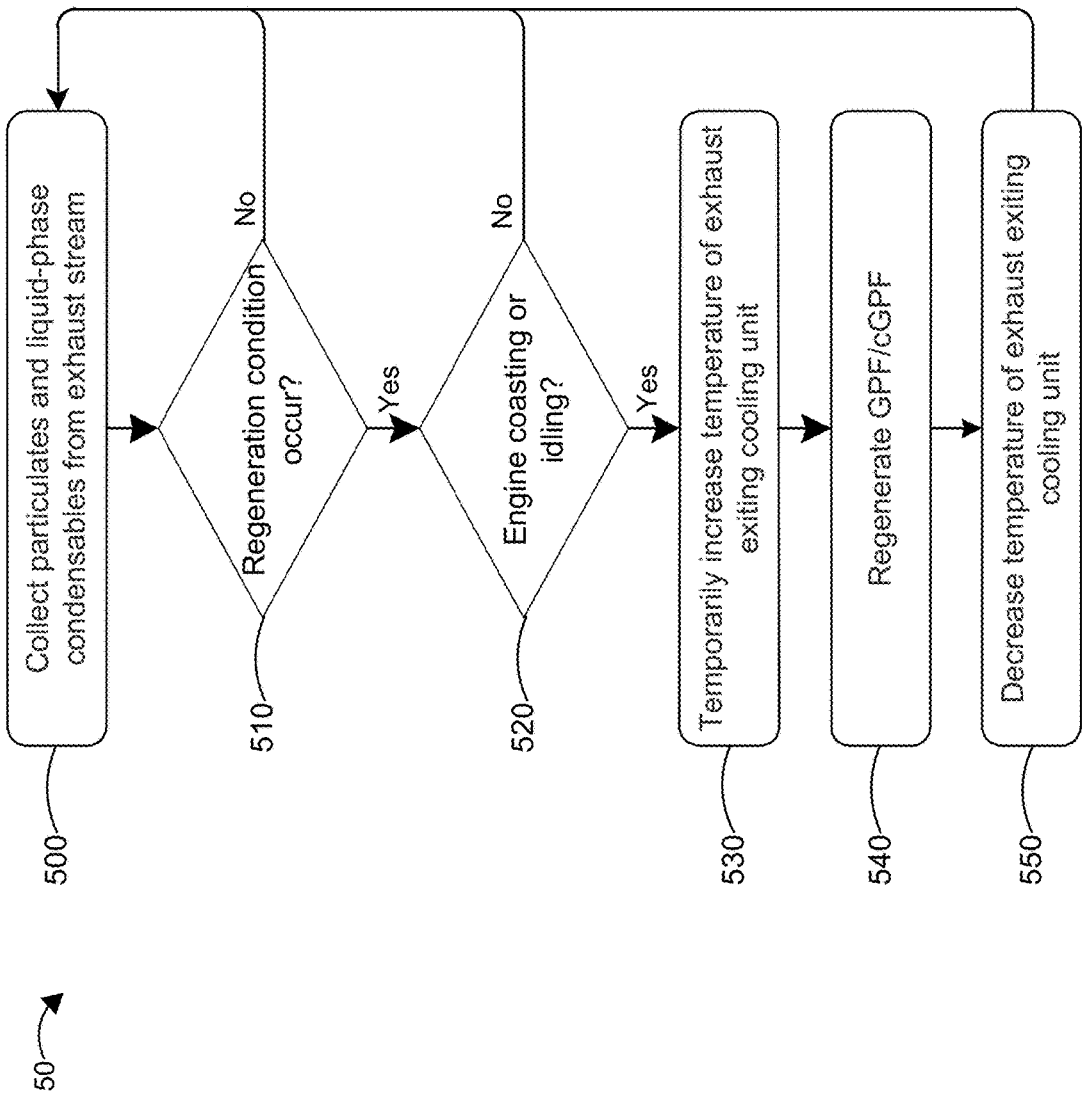
FIG. 5 is a flow chart of a method for operating and regenerating a GPF/cGPF in an exhaust aftertreatment system, according to one or more embodiments.

FIG. 5 is a flow chart 50 of a method for operating and regenerating a GPF/cGPF (in general, GPF) in an exhaust aftertreatment system. The method according to flow chart 50 can be performed on any of the systems described herein (e.g., systems 20, 30, 60, 70, 80, 90, and/or 1000). In step 500, the GPF collects particulates, such as black and brown carbon, and liquid-phase condensables from the exhaust stream. After a predetermined time period (e.g., once a day or every 100 miles), a controller in the exhaust aftertreatment system at step 510 determines whether a regeneration condition has occurred. The regeneration condition can be based on time (e.g., once a day, once a week, once a month, or other time period), based on mileage (e.g., every 500 miles, every 1,000 miles, or other mileage interval), based on the pressure drop across the GPF exceeds a predetermined value, based on a combination of time or mileage or pressure drop (e.g., once a week or once every 300 miles or when the pressure drops exceeds a predetermined value, whichever occurs first), or other factors. If the controller determines that the regeneration condition has not been met, the flow chart returns to step 500 and the GPF continues to collect particulates and liquid-phase condensables from the exhaust. If the controller determines that the regeneration condition has been met, the controller then determines at step 520 whether the engine is in an idling or coasting state, for example based on the engine's RPMs and/or the fuel intake of the engine. If the engine is not in an idling or coasting state, the flow chart 50 returns to step 500 and the GPF continues to collect particulates and liquid-phase condensables from the exhaust for a predetermined time period, which can be the same or less than the regeneration period used for the regeneration condition. For example, the predetermined time period can be less than an hour, such as 15 minutes, in some embodiments. In another example, the controller continuously checks whether the engine is in an idling or coasting state.

After the predetermined time period (or on a continuous basis), the controller proceeds through steps 510 and 520 to determine again whether the engine is in an idling or coasting state. When the controller determines at step 520 that the engine is in an idling or coasting state, the controller at step 530 causes the temperature of the exhaust exiting the cooling unit to increase (e.g., by adjusting a bypass valve and/or by adjusting the coolant flow rate, as described above) to reach a temperature sufficient to oxidize the particulates and liquid-phase condensables collected by the GPF. The temperature of the exhaust exiting the cooling unit can be increased to about 500° F. to about 1,000° F., such as about 600° F., about 700° F., about 800° F., about 900° F., or any value or range between any two of the foregoing values. In step 540, the GPF regenerates using the high temperature exhaust to oxidize the particulates and liquid-phase condensables collected by the GPF. After the GPF regeneration is complete or if the controller determines that the engine is no longer in an idling or coasting state, the controller causes the cooling unit to lower the temperature of the exhaust exiting the cooling unit to the operating temperature of about 300° F. to about 500° F., or about 400° F., as discussed above. After the exhaust temperature is decreased in step 550, the flow chart 50 returns to step 500 where the GPF collects particulates and liquid-phase condensables from the exhaust. If the GPF regeneration was completed in step 540, the controller resets the regeneration period when the flow chart 50 returns to step 500. If the GPF regeneration did not complete at step 540 because the engine was no longer in an idling or coasting state, the controller can reset the regeneration condition to a secondary regeneration condition (e.g., a shorter regeneration time period) when the flow chart 50 returns to step 500. Alternatively, the controller does not reset the regeneration condition in which case the flow chart 50 passes immediately to steps 510 and 520 in an attempt to complete the GPF regeneration process.

The unit acting as the PM filter (e.g., the GPF or cGPF) may also need to be cleaned of non-combustible materials, which cannot be removed through the oxidation/regeneration process described above, by physically removing and cleaning the unit, as done in other similar units in the vehicle. In some instances, the unit acting as the PM filter may need to be replaced.

Figure 6:
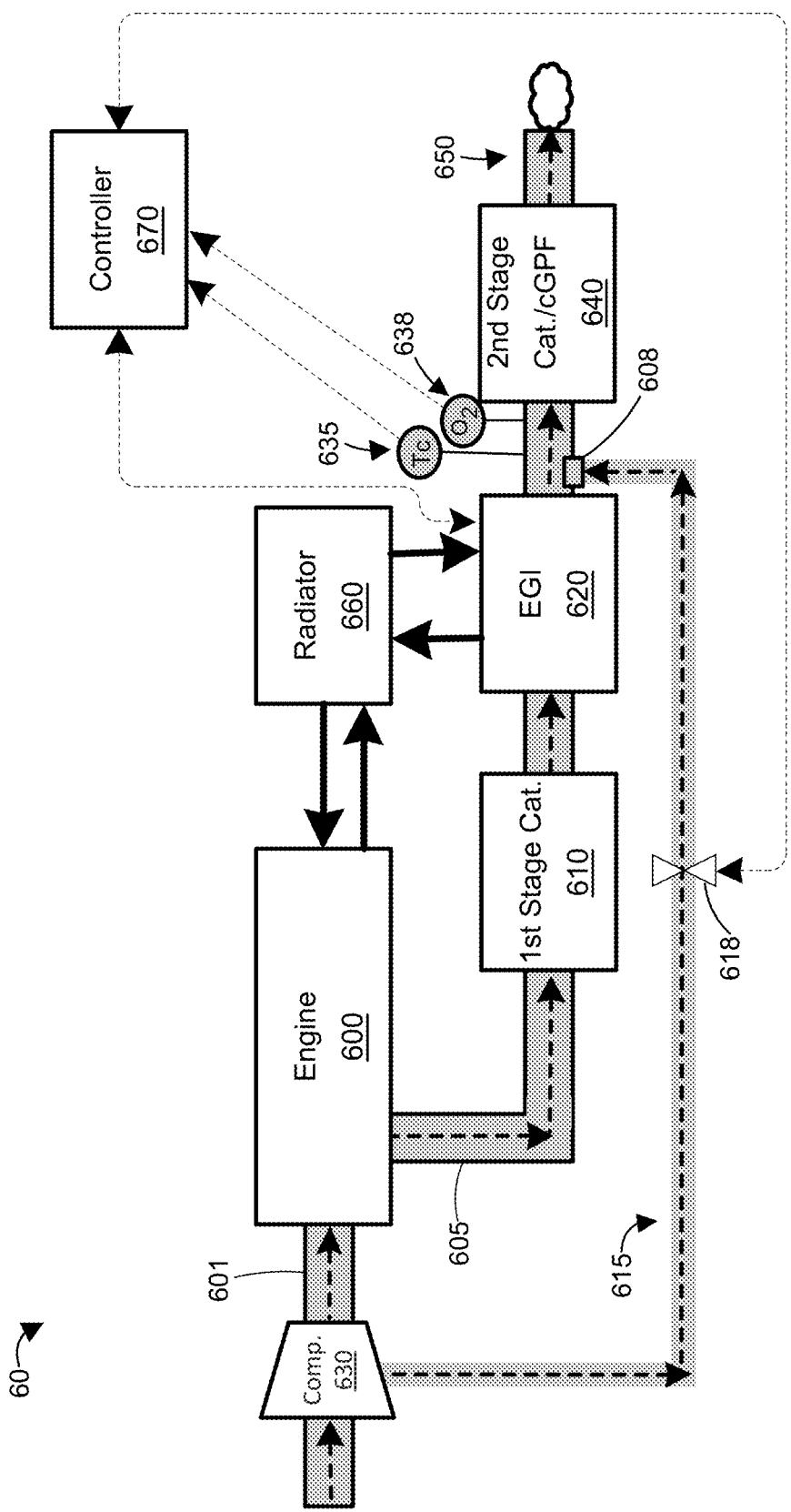
FIG. 6 is a block diagram of an exhaust aftertreatment system according to one or more embodiments.

FIG. 6 is a block diagram of an exhaust aftertreatment system 60 according to one or more embodiments. The exhaust aftertreatment system 60 includes a first stage catalytic converter 610, an exhaust gas intercooler (EGI) 620, an engine charger compressor 630, and a second stage catalytic converter 640. In operation, compressed air from engine charger compressor 630 flows through compressed air conduit 601 to the air intake of engine 600, which uses the compressed air to combust fuel. The engine charger compressor 630 can be a turbocharger compressor or a supercharger compressor for engine 600. For example, compressor 630 can be a turbine-driven compressor used to turbocharge engine 600. In another example, compressor 630 can be a mechanically-driven or an electrically-driven compressor (e.g., an e-compressor) used to supercharge engine 600. In some embodiments, engine 600 includes both a turbocharger compressor and a supercharger compressor.

Exhaust gas exits engine 600 through an exhaust conduit 605 that passes through the first stage catalytic converter 610, the EGI 620, and the second stage catalytic converter 640 to tail pipe 650. Engine 600 can operate with an air-fuel ratio (AFR) in the rich burn regime (i.e., greater than or equal to a stoichiometric AFR), and thus can produce exhaust gases that contain a minimal or a substantially zero oxygen content (e.g., as described above with respect to engine 200).

The first stage catalytic converter 610 can be the same or substantially the same as first stage catalytic converter 210 described above. Thus, first stage catalytic converter 610 can include a catalyst comprising one or more PGMs, such as Pt, Pd, and/or Rh. In some embodiments, the first stage catalytic converter 610 includes a TWC. The first stage catalytic converter 610 promotes chemical reactions (e.g., reduction reactions) that remove $NO_x$ compounds from the exhaust stream (e.g., by reducing $NO_x$ to form $N_2$ and $O_2$). The first stage catalytic converter 610 can also promote chemical reactions that reduce the concentration of CO and $C_xH_y$ compounds from the exhaust stream.

After passing through the first stage catalytic converter 610, the exhaust flows into the EGI 620, which can be the same or substantially the same as EGI 220 described above. EGI 620 lowers the temperature of the exhaust to about 400° F., such as about 300° F. to about 500° F. or about 350° F. to about 450° F. In some embodiments, EGI 620 lowers the temperature of the exhaust to about 300° F., about 325° F., about 350° F., about 375° F., about 400° F., about 425° F., about 450° F., about 475° F., about 500° F., or any value or range between any two of the foregoing values. The EGI 620 includes a cooled path in which EGI 620 cools the exhaust and an optional bypass path that is not cooled by the EGI 620 (e.g., as described above with respect to EGI 220). The EGI 620 can be a heat exchanger or other cooling device, which receives radiator cooling fluid from radiator 660.

After the exhaust gas exits the EGI 620, it passes through exhaust conduit 605 to the second stage catalytic converter 640. The exhaust conduit 605 includes an inlet port 608 disposed between the EGI 620 and the second stage catalytic converter 640. The inlet port 608 fluidly couples an air ejection conduit 615 to exhaust conduit 605. The air ejection conduit 615 extends to compressor 630 (as illustrated) or to compressed air conduit 601. In operation, a portion of compressed air produced by compressor 630 flows through air ejection conduit 615 and is ejected into exhaust conduit 605 through inlet port 608. As a result of introducing compressed air into exhaust conduit 605, the exhaust gas has an increased oxygen content before it passes through second stage catalytic converter 640 than it does when the exhaust gas enters first stage catalytic converter 610. For example, the oxygen content of the exhaust gas can be at least about 0.1% by volume, such as at least about 0.25% by volume, at least about 0.5% by volume, at least about 0.75% by volume, at least about 1% by volume, or a higher concentration. A secondary benefit of ejecting compressed air into exhaust conduit 605 is that it causes a reduction of the pressure drop across the aftertreatment system 60 and the increased flow rate of the compressed air improves the flow of exhaust towards tail pipe 650. The improved flow of exhaust towards tail pipe 650 decreases the back pressure of exhaust in the exhaust conduit 605 immediately downstream of the engine 600 (e.g., between inlet port 608 and engine 600). A reduced back pressure of exhaust improves efficiency/mileage and/or performance of engine 600. While in general undesirable, under some circumstances a slight back pressure in the exhaust pipe downstream of the exhaust port can be beneficial; it forces more of the exhaust gas go back into the engine cylinders leading to the reduction of the combustion temperature and a reduction of the likelihood of knocking. This can be used by the engine control unit to advance the spark and further improve the engine efficiency.

A thermocouple 635 and an oxygen sensor 638 are preferably disposed between the inlet port 608 of exhaust conduit 605 and the second stage catalytic converter 640. The thermocouple 635 measures the temperature of the exhaust and provides the measured temperature as an input to a microprocessor-based controller 670 to control the exhaust temperature (e.g., as described above). The oxygen sensor 638 measures the oxygen concentration in the exhaust and provides the measured oxygen concentration as an input to controller 670 for the vehicle to control the oxygen concentration. To adjust the oxygen concentration, controller 670 adjusts the operating position of flow control valve 618 which is in electrical communication with controller 670. Controller 670 compares the measured oxygen content with a target oxygen concentration or target oxygen concentration range (e.g., as described above) and adjusts the operating position of flow control valve 618 accordingly. Control valve 618 can be a throttle valve, a butterfly valve, a ball valve, a check valve, a globe valve, a solenoid valve, or other valve.

The second stage catalytic converter 640 can be the same or substantially the same as second stage catalytic converter 240 described above. Thus, second stage catalytic converter 640 can include a catalyst comprising one or more PGMs, such as Pt, Pd, and/or Rh. In some embodiments, the second stage catalytic converter 610 includes a TWC. In some embodiments, the second stage catalytic converter 640 can include one or more oxygen storage catalysts, such as Ce and/or Zr. As with second stage catalytic converter 240, second stage catalytic converter 640 can also include a GPF as a modular or integrated unit. In some embodiments, second stage catalytic converter 640 can include or can be a cGPF.

Figure 7:
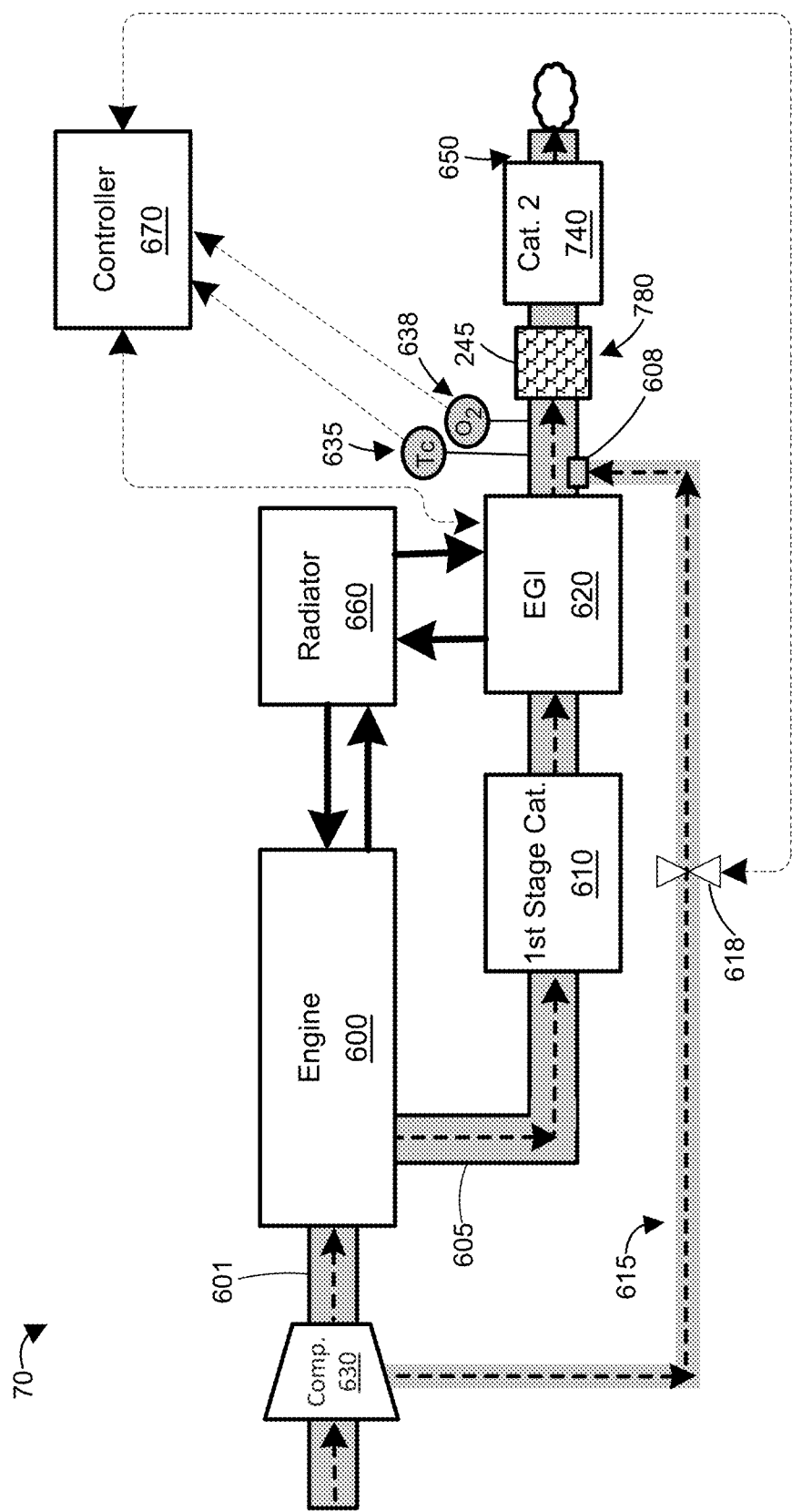
FIG. 7 is a block diagram of an exhaust aftertreatment system according to one or more embodiments.

FIG. 7 illustrates an exhaust aftertreatment system 70 that is an alternative embodiment of system 60. System 70 is the same or similar to system 60 except as described below. In place of the optional combined second stage catalytic converter/cGPF 640 in system 60, system 70 includes a GPF 780 disposed between the inlet port 608 of exhaust conduit 605 and the inlet to second stage catalytic converter 740. GPF 780 can be the same or substantially the same as GPF 380, described above. In an alternative embodiment, the GPF 780 can be disposed between the outlet of EGI 620 and the inlet port 608. The second stage catalytic converter 740 is otherwise the same or similar to second stage catalytic converter 640. For example, second stage catalytic converter 740 can include one or more PGMs, one or more oxygen storage catalysts, and/or a TWC.

Figure 8:
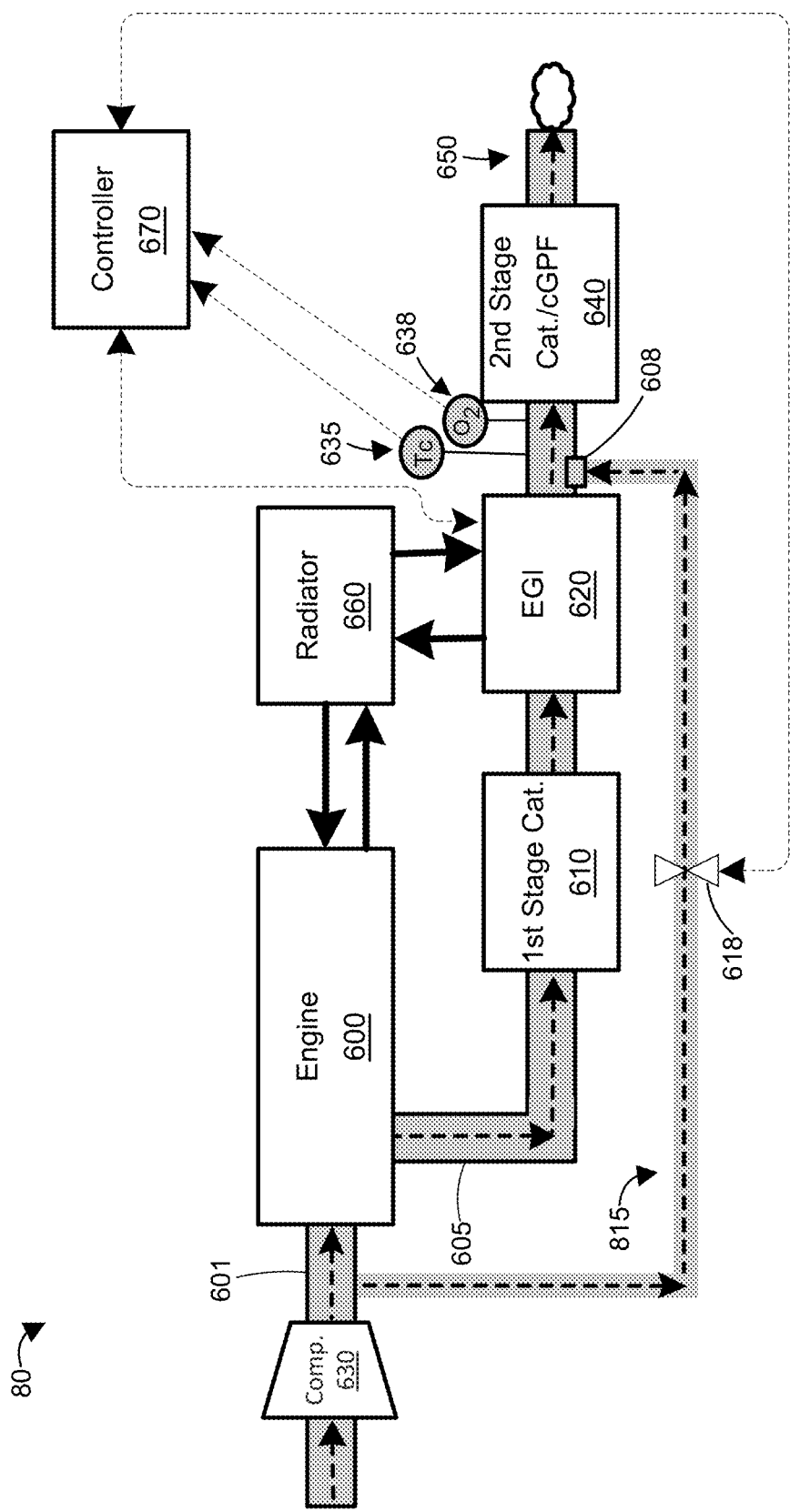
FIG. 8 is a block diagram of an exhaust aftertreatment system according to one or more embodiments.

FIG. 8 illustrates an exhaust aftertreatment system 80 that is an alternative embodiment of system 60. System 80 is the same or similar to system 60 except that the air ejection conduit 815 is coupled to compressed air conduit 601 instead of charger compressor 630.

Figure 9:
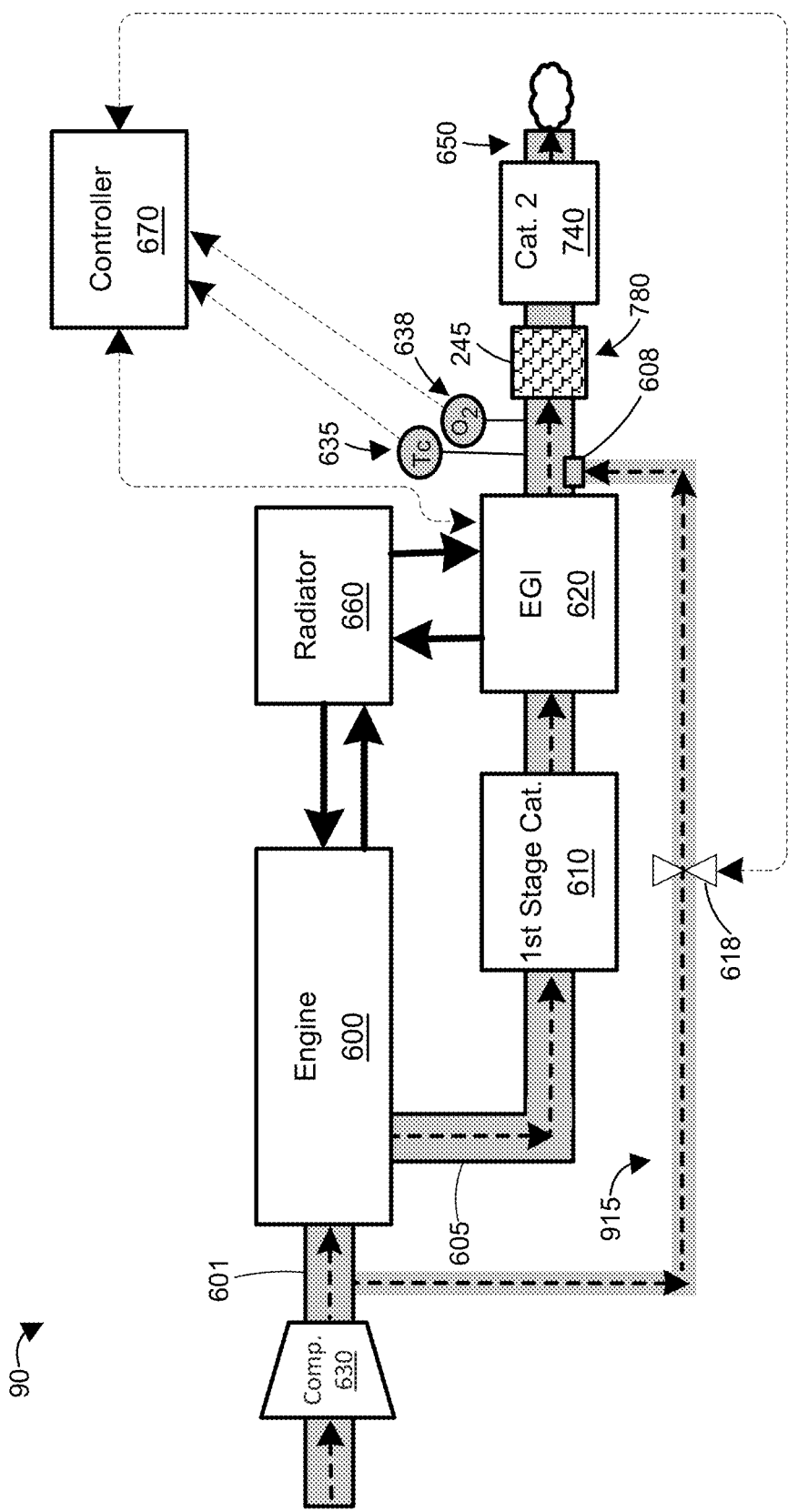
FIG. 9 is a block diagram of an exhaust aftertreatment system according to one or more embodiments.

FIG. 9 illustrates an exhaust aftertreatment system 90 that is an alternative embodiment of system 70. System 90 is the same or similar to system 70 except that the air ejection conduit 915 is coupled to compressed air conduit 601 instead of charger compressor 630. It is noted that GPF 780 is an optional feature in system 90. Thus, GPF 780 can be removed from system 90 in some embodiments. Additionally, GPF 780 can be combined with second stage catalytic converter 740 as a modular or integrated unit of second stage catalytic converter 740. In some embodiments, second stage catalytic converter 740 is or includes a cGPF, in which case GPF 780 and second stage catalytic converter 740 are merged into the cGPF (e.g., as described above with respect to FIGS. 2, 6, and 8).

Figure 10:
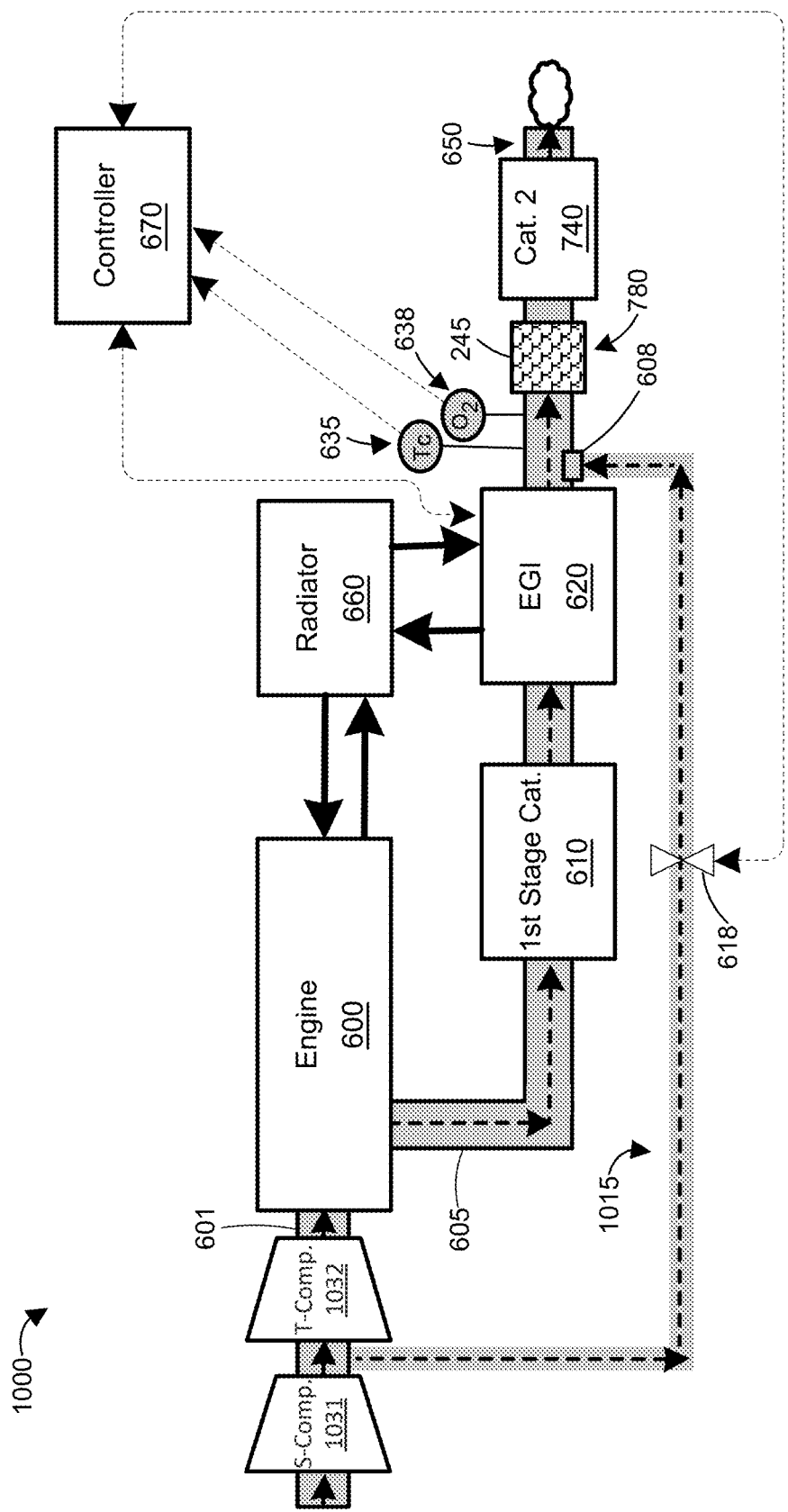
FIG. 10 is a block diagram of an exhaust aftertreatment system according to one or more embodiments.

FIG. 10 illustrates an exhaust aftertreatment system 1000 that is an alternative embodiment of systems 70 and 90. System 90 is the same or similar to systems 70 and 90 except that the air ejection conduit 1015 is coupled to compressed air conduit 601 between supercharger compressor 1031 and turbocharger compressor 1032. Supercharger compressor 1031 can be a mechanically-driven or an electrically-driven compressor (e.g., an e-compressor) used to supercharge engine 600. Turbocharger compressor 1032 can be a turbine-driven compressor (e.g., coupled to a turbine in exhaust conduit 605). Air ejection conduit 1015 can alternatively be coupled to supercharger compressor 1031, to turbocharger compressor 1032, or to compressed air conduit 601 between turbocharger compressor 1032 and engine 600.

It is noted that GPF 780 is an optional feature in system 1000. Thus, GPF 780 can be removed from system 1000 in some embodiments. Additionally, GPF 780 can be combined with second stage catalytic converter 740 as a modular or integrated unit of second stage catalytic converter 740. In some embodiments, second stage catalytic converter 740 is or includes a cGPF, in which case GPF 780 and second stage catalytic converter 740 are merged into the cGPF (e.g., as described above with respect to FIGS. 2 and 6).

Figure 11:
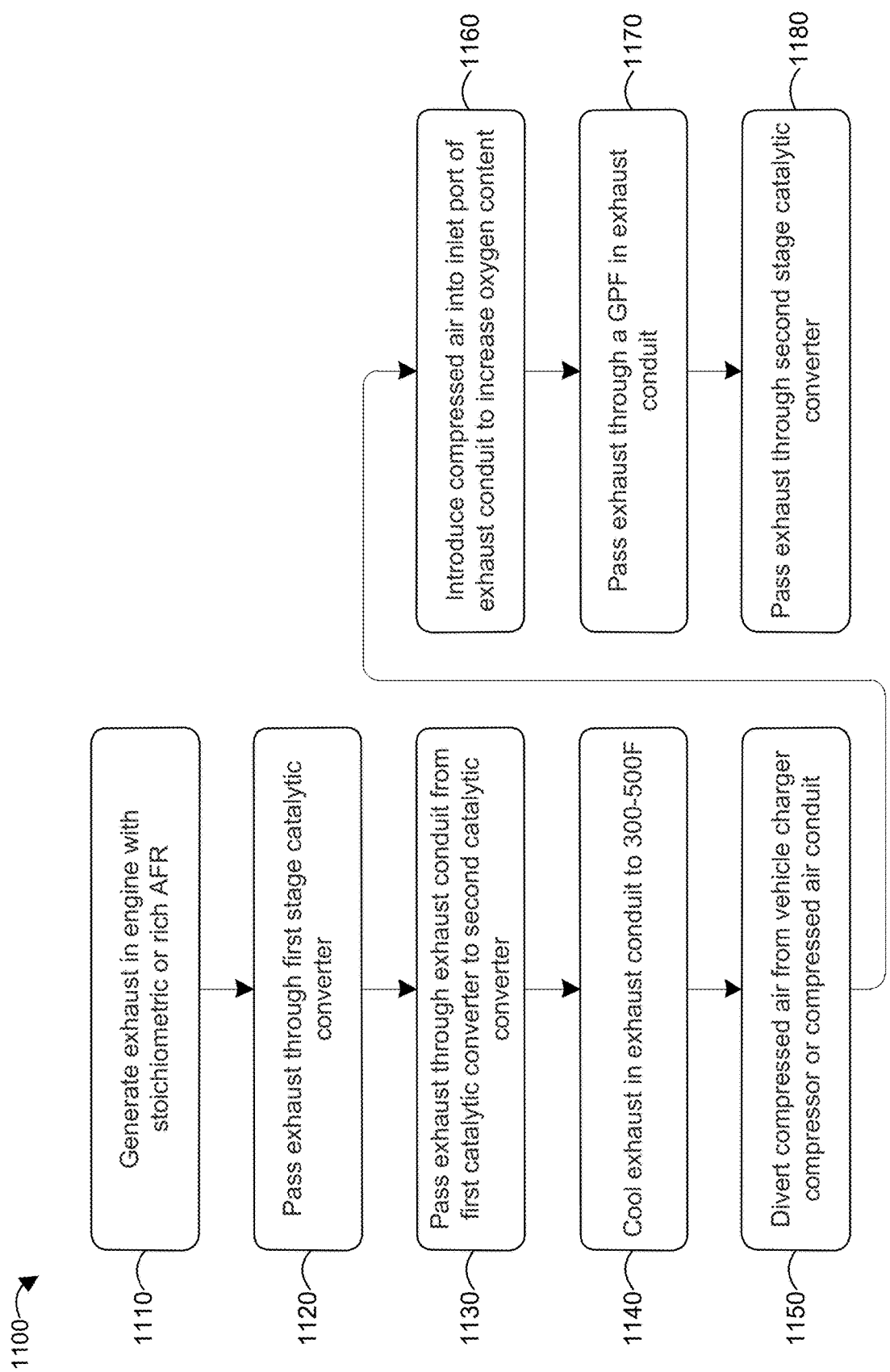
FIG. 11 is a flow chart that illustrates a method of treating exhaust from an engine according to one or more embodiments.

FIG. 11 is a flow chart 1100 that illustrates a method of treating exhaust from an engine according to one or more embodiments. The method according to flow chart 1100 can be performed on any of the systems described herein (e.g., systems 20, 30, 60, 70, 80, 90, and/or 1000). In step 1110, an internal combustion engine running at a stoichiometric or a rich AFR generates exhaust, which is free or substantially free of oxygen (e.g., as described above). Alternatively, the internal combustion engine can run at a lean AFR. In step 1120, the exhaust is passed through a first stage catalytic converter. The first stage catalytic converter includes one or more active catalytic elements (e.g., a PGM and/or a TWC) that catalyzes a chemical reaction to reduce the concentration of nitrogen oxide compounds in the exhaust. The first stage catalytic converter can also promote chemical reactions that reduce the concentration of CO and $C_xH_y$ compounds from the exhaust. In step 1130, the exhaust is passed through an exhaust conduit that extends from the first stage catalytic converter to a second stage catalytic converter. In step 1140, the exhaust is cooled to about 400° F., such as about 300° F. to about 500° F. or about 350° F. to about 450° F. In some embodiments, the exhaust is cooled to about 300° F., about 325° F., about 350° F., about 375° F., about 400° F., about 425° F., about 450° F., about 475° F., about 500° F., or any value or range between any two of the foregoing values. In some embodiments, the exhaust is cooled using an exhaust gas intercooler, such as a heat exchanger. The exhaust gas intercooler can include a coolant loop that is in thermal communication with the vehicle's radiator. The vehicle's microprocessor-based controller can adjust the cooling (e.g., by adjusting the bypass valve and/or the flow rate of the coolant loop) based on feedback from a thermocouple disposed in the exhaust conduit between the exhaust gas intercooler and a second stage catalytic converter.

In step 1150, a stream of compressed air is diverted from the vehicle's charger compressor (e.g., a turbocharger compressor or a supercharger compressor), which compresses air for use in the vehicle's engine, into an air ejection conduit. Alternatively, the stream of compressed air is diverted into the air ejection conduit from a compressed air conduit that extends from the vehicle's charger compressor to the engine. In step 1160, at least a portion of the diverted compressed air in air ejection conduit is introduced into an inlet port in the exhaust conduit to increase the oxygen concentration in the exhaust. The flow rate of air ejected into the inlet port can be controlled by adjusting the operating position of a valve in the air ejection conduit. The vehicle's microprocessor-based controller can adjust the operating position of the valve (e.g., through electromechanical action) based on feedback from an oxygen sensor disposed in the exhaust conduit between the inlet port in the exhaust conduit and the second stage catalytic converter. In some embodiments, the controller has a target oxygen concentration or a target oxygen concentration range (e.g., as described above), and the operating position of the valve is adjusted so that the measured oxygen concentration is equal or substantially equal to the target oxygen concentration or target oxygen concentration range.

In step 1170, the cooled exhaust is passed through a GPF, which collects liquid-phase condensables, semivolatile particles, and other particulates in the exhaust such as black carbon (e.g., as described above with respect to FIG. 4). The oxygen concentration in the exhaust is optionally increased before passing the exhaust through the GPF (i.e., step 1160 optionally occurs before step 1170).

In step 1180, the exhaust is passed through a second stage catalytic converter. The second stage catalytic converter includes one or more active catalytic elements (e.g., one or more PGMs, one or more oxygen storage catalysts, and/or a TWC) that catalyzes chemical reactions to reduce the concentration of unburned hydrocarbons and carbon monoxide in the exhaust. The second stage catalytic converter can also reduce the concentration of nitrogen oxide compounds in some embodiments. In some embodiments, the second stage catalytic converter is a cGPF, in which case steps 1160 and 1170 can be performed using the cGPF In the foregoing specification, the invention has been described with reference to specific embodiments. However, one of ordinary skill in the art appreciates that various modifications and changes can be made without departing from the scope of the disclosure and embodiments described herein. Accordingly, the specification and figures are to be regarded in an illustrative rather than a restrictive sense, and all such modifications are intended to be included within the scope of this disclosure.

What is claimed is:

1. An exhaust aftertreatment system comprising:
a first catalytic converter including a three-way catalyst, the first catalytic converter receiving an exhaust generated by a spark-ignited internal combustion engine;
a second catalytic converter including an oxidation catalyst or a three-way catalyst;
an exhaust gas intercooler disposed between said first catalytic converter and said second catalytic converter, said exhaust gas intercooler configured to reduce a temperature of said exhaust to be within a range of about 300° F. to about 500° F.;
an exhaust conduit extending from said first catalytic converter to said second catalytic converter, said exhaust conduit in thermal communication with said exhaust gas intercooler;
an engine charger compressor;
a compressed air conduit extending from said engine charger compressor to an intake of said engine;
an air ejection conduit extending from (a) said engine charger compressor or (b) said compressed air conduit to (c) said exhaust conduit, wherein said air ejection conduit introduces a stream of compressed air into said exhaust conduit between said exhaust gas intercooler and said second catalytic converters;
a gas particulate filter (GPF) coupled to said exhaust conduit; and
a controller in electrical communication with the exhaust gas intercooler and the engine, the controller configured to:
determine whether a regeneration period for said GPF has been exceeded, and
when the regeneration period has been exceeded:
determine when the engine is in an idling or a coasting state, and
when said engine is in said idling or said coasting state, temporarily increase the temperature of the exhaust to oxidize particulate matter retained by said GPF, thereby regenerating said GPF.

2. The exhaust aftertreatment system of claim 1, wherein said engine charger compressor is a turbocharger compressor or a supercharger compressor.

3. The exhaust aftertreatment system of claim 1, further comprising a flow control valve disposed in said air ejection conduit, said flow control valve in electrical communication with the controller to adjust an operating position of said flow control valve.

4. The exhaust aftertreatment system of claim 3, further comprising an oxygen sensor disposed in said exhaust conduit between (a) an inlet port for said compressed air conduit and (b) said second catalytic converter, the oxygen sensor outputting an oxygen content of said exhaust to said controller.

5. The exhaust aftertreatment system of claim 4, wherein said controller is configured to adjust said operating position of said flow control valve such that said oxygen content is at least about 0.1% by volume.

6. The exhaust aftertreatment system of claim 1, wherein said second catalytic converter and said GPF are integrated in a catalyzed gas particulate filter, said catalyzed gas particulate filter comprising said oxidation catalyst or said three-way catalyst.

7. The exhaust aftertreatment system of claim 1, wherein said exhaust gas intercooler comprises a heat exchanger, said heat exchanger including a coolant fluid loop that extends between said heat exchanger and a radiator for said engine.

8. The exhaust aftertreatment system of claim 1, wherein the controller is configured to return said exhaust in said exhaust conduit to be within the range of about 300° F. to about 500° F. after (a) a predetermined time period or (b) said controller determines that said engine is no longer in said idling or said coasting state.

9. The exhaust aftertreatment system of claim 8, wherein the controller is configured to return said exhaust in said exhaust conduit to be within the range of about 300° F. to about 500° F. when, during the predetermined time period, the controller determines that said engine is no longer in said idling or said coasting state.

10. A method for reducing emissions from an engine, the method comprising:
generating an exhaust in a spark-ignited internal combustion engine;
passing the exhaust through a first catalytic converter that includes a three-way catalyst, the first catalytic converter reducing a first concentration of nitrogen oxide ($NO_x$), carbon monoxide (CO), and hydrocarbons ($C_xH_y$) compounds in the exhaust;
passing the exhaust through an exhaust conduit that extends from said first catalytic converter to a second catalytic converter;
cooling said exhaust in said exhaust conduit to be within a range of about 300° F. to about 500° F., said exhaust conduit in thermal communication with an exhaust gas intercooler;
diverting compressed air from (a) an engine charger compressor or (b) a compressed air conduit extending from said engine charger compressor to said engine;
ejecting said compressed air into an inlet port of said exhaust conduit to increase an oxygen content of said exhaust, said inlet port disposed between said exhaust gas intercooler and second catalytic converter; and
passing said exhaust into said second catalytic converter that includes an oxidation catalyst or a three-way catalyst, the second catalytic converter reducing a second concentration of CO and $C_xH_y$ in said exhaust;
passing said exhaust through a gas particulate filter (GPF) coupled to said exhaust conduit;
with a controller in electrical communication with said engine and said exhaust gas intercooler,
determining whether a regeneration period for said GPF has been exceeded;
determining when said engine is in an idling or a coasting state; and
when said engine is in said idling or said coasting state, temporarily increasing an exhaust temperature of said exhaust to oxidize particulate matter retained by said GPF, thereby regenerating said GPF.

11. The method of claim 10, wherein said engine charger compressor is a turbocharger compressor or a supercharger compressor.

12. The method of claim 10, further comprising passing said compressed air through an air ejection conduit that that extends from (a) said engine charger compressor or (b) said compressed air conduit to (c) said exhaust conduit.

13. The method of claim 12, further comprising adjusting an operating position of a control valve disposed in said air ejection conduit, wherein said operating position corresponds to a flow rate of said compressed air into said exhaust conduit.

14. The method of claim 13, further comprising:
receiving, at a controller, an oxygen content of said exhaust from an oxygen sensor disposed in said exhaust conduit between (a) said inlet port for said compressed air conduit and (b) said second catalytic converter; and
adjusting said operating position of said control valve such that said oxygen content is at least about 0.1% by volume.

15. The method of claim 10, further comprising:
returning said exhaust in said exhaust conduit to be within the range of about 300° F. to about 500° F. after (a) a predetermined time period or (b) said controller determines that said engine is no longer in said idling or said coasting state.

16. The method of claim 15, further comprising, with the controller, returning said exhaust in said exhaust conduit to be within the range of about 300° F. to about 500° F. when, during the predetermined time period, the controller determines that said engine is no longer in said idling or said coasting state.

17. The method of claim 10, wherein said second catalytic converter and said GPF are integrated in catalyzed gas particulate filter (cGPF), said cGPF comprising said oxidation catalyst or said three-way catalyst.

* * * * *